US005478592A

United States Patent [19]

Kingsley et al.

[11] Patent Number: 5,478,592
[45] Date of Patent: Dec. 26, 1995

[54] PROCESS FOR PREPARING FLAVORED AGED COFFEE

[76] Inventors: I. Steven Kingsley, 576 Northern Pkwy., Ridgewood, N.J. 07450; Robert Jacobs, 333 Rector Pl., New York, N.Y. 10280

[21] Appl. No.: 251,727

[22] Filed: May 31, 1994

[51] Int. Cl.$^6$ .................................................. A23F 5/00
[52] U.S. Cl. .................................. 426/594; 426/595
[58] Field of Search ................................. 426/594, 595

[56] References Cited

U.S. PATENT DOCUMENTS

| | | | |
|---|---|---|---|
| 4,188,409 | 2/1980 | Kay | 426/595 X |
| 4,374,864 | 2/1983 | Hufuagel et al. | 426/594 |
| 4,386,109 | 5/1983 | Bowen | 426/241 |
| 4,990,734 | 2/1991 | Hirsch | 99/306 X |

*Primary Examiner*—Donald E. Czaja
*Assistant Examiner*—Lien Tran

[57] ABSTRACT

Coffee and coffee products are flavored with malt and cinnamon flavoring in a three step process, referred to as "flavor aging", which contrary to current and previous practice and knowledge of the art, uses air, air permeable packaging containers or a combination of both to develop said products' flavor, aroma and body to their fullest and to maximize their shelf-life in such air permeable, environmentally benign packaging. The coffee and coffee products are then preferably used with French press type coffee brewers to prepare the fresh beverage for immediate consumption.

10 Claims, No Drawings

PROCESS FOR PREPARING FLAVORED AGED COFFEE

BACKGROUND OF INVENTION

In the last 10 to 15 years a large and growing number of flavored coffee and coffee products have come to the market, as a response to consumers' preferences for easy to prepare fresh brewed specialty coffee and coffee beverages.

Current and previous manufacturing and packaging technology have created a one step flavoring method and flavorings to accommodate it, along with vacuum or nitrogen flushing, non-air permeable packaging containers, in order to minimize manufacturing time and cost while maximizing distribution efficiencies and shelf-life. These solutions, although adequate to produce less then optimum quality flavored coffee products, still have three major disadvantages:

1. Rapid loss of flavor strength and aroma, requiting expensive, non-biodegradable packaging containers, sealed under vacuum or nitrogen flushed to achieve long shelf-life, i.e. 6–12 months.

2. Development of staleness and loss of body, upon opening the packaging container and exposing the whole bean or ground coffee to ambient air.

3. Development of rancidity, due to oxidative degradation of the flavor and other aromatic flavor and coffee compounds, resulting in objectionable off-flavor and aroma after more than 48–72 hours of exposure to ambient air in an open container at the place of use.

It is the object of the present invention to provide flavored coffee and coffee products of very high quality, which retain full flavor, aroma and body characteristics for up to six months, without the use of expensive, non-biodegradable packaging materials and without the use of elaborate vacuum or nitrogen flush packaging and sealing.

It is another object of the present invention to provide a simple three stage flavoring process, where the last stage actually takes place in the packaging container itself, upon closing or sealing, in order to develop full flavor, aroma and body for the coffee or coffee product filled into said container.

It is yet another object of the present invention to use the air in the packaging container—either the amount left after sealing or what flows through it at a controlled rate, determined by the packaging material itself as well as the container's proximity to other items—to develop the full flavor and aroma of the coffee and coffee products.

It is yet an additional object of the present invention to use biodegradable, or environmentally benign packaging materials when feasible, such as wax or biopolymer coated paper bags and pouches, polyethylene or other food grade polymer coated paper bags and pouches, which also allow for controlled air flow through the container, due to their air porosity and permeability.

It is yet a further object of the present invention to use flavorings which not only withstand the oxidizing and dilution effects of air in the packaging container, but actually utilize this air, to develop the full flavor and aroma of the coffee and coffee products.

It is yet a further object of the present invention to utilize the filterless, direct extraction method of "French press" type coffee brewers, to prepare the highest quality coffee and coffee beverages for immediate consumption.

Finally, it is yet another object of the present invention to combine said flavor-aged ground coffee product with a coffee whitener, cappuccino, mocha, or other flavored dairy or non-dairy base dry powder mixture in the packaging container, in order to develop a smooth flavor combination and to make possible the preparation of a complete, fresh brewed coffee beverage in one step, using a French press type coffee brewing unit.

DESCRIPTION OF THE INVENTION

Coffee and coffee products are flavored in air-tight containers for a minimum of 12 hours to a maximum of 168 hours, then further aged in their packaging container for at least another 96 hours, while being in constant contact with a controlled amount of air, to develop their aroma, flavor and body to their fullest.

In the first embodiment of the present invention, the roasted coffee beans are coated in a tumbler with a liquid flavoring specially developed for the flavor aging process, in which the beans are moved around until they are evenly covered. Afterwards, they are poured into and kept in an airtight container for up to 168 hours. The beans are then dried completely in flowing warm air and packaged into either bag or pouch containers formed from a coated or laminated paper material, where the coating or lamination(s) are made of food grade wax, biopolymer or polymer film, such as cellulose derivatives, cellophane or low-density polyethylene, polypropylene, and all other film forming compounds approved for food packaging, storage and distribution. Traditional packaging materials and containers may also be used, such as metallized composite laminated polymer film bags and pouches, as well as tin and other metal, polymer or glass jars, seals and lids. Vacuum or nitrogen flushing is not required or applied to extend shelf-life, when sealing these containers. Within another 144 hours the flavored coffee develops its full, distinctive flavor and aroma in the presence of air, which is left in the container upon sealing, or flows through it at a controlled rate, determined by the air permeability of the packaging material and the container's proximity to other objects around it.

In the second embodiment of the present invention, the roasted coffee beans are coated in a tumbler with a liquid flavoring, again specially developed for the flavor aging process, in which the beans are moved around until they are evenly covered. Afterwards, they are poured into and kept in an airtight container for up to 36 hours. The beans are then ground to a consistency of all-purpose, drip, espresso or any other coffee grind in use. This ground, flavored coffee is then kept in an airtight container for up to 60 hours, then packaged and aged the same way described in the first embodiment.

In the third embodiment of the present invention, the product of the second embodiment is compounded with a dry, powdered dairy or non-dairy based mixture, such as a coffee whitener, cappuccino, mocha or other flavored coffee beverage preparation aid. This complete coffee beverage mix is then packaged and aged the same way as the products of the first and second embodiments.

It has been discovered that by using the liquid flavorings specially developed for the flavor aging process, along with the aging process itself, the resulting coffee and coffee products are no longer prone to a significant loss of flavor and aroma when exposed to air during aging, storage and distribution, but, in effect, require its presence to fully develop their flavor and aroma.

It has also been discovered, that the flavoring and aging process of the present invention provides a very high quality, full strength product for up to six months, even in containers which allow air to permeate through their contents at a controlled rate. As such, the products of the present invention can be packaged, stored and distributed in environmentally benign or biodegradable materials, such as wax, biopolymer or polymer coated, air permeable paper bags and pouches.

It has further been discovered, that flavor aged ground coffee and a dry, powdered dairy or non-dairy based mixture, such as a coffee whitener, cappuccino, mocha or other flavored coffee beverage preparation aid, when compounded and packaged, without the use of vacuum or nitrogen flush, in environmentally benign or biodegradable materials, such as wax, biopolymer or polymer coated air permeable paper bags and pouches, as well as in traditional packaging materials, such as metallized composite laminated polymer film bags and pouches, develop a very smooth, yet potent flavor combination, due to the infusion of flavor and aromatic compounds from the coffee beverage powder mixture into the ground coffee particles, during the third stage of the flavor aging process, which takes place in the packaging container.

Finally, it has been discovered, that the compounded flavor aged ground coffee and dry, powdered dairy or non-dairy based mixture, such as a coffee whitener, cappuccino, mocha or other flavored coffee beverage preparation aid, when packed and aged together in an environmentally benign, biodegradable, or traditional packaging container, again without the use of vacuum or nitrogen flush, provide a new product, which can be used in a "French press" type coffee maker, to produce a fresh brewed coffee beverage, as the coffee whitener, or cappuccino, or mocha or other flavorings, along with milk and cream derived ingredients are dissolved at the same time, in the same apparatus used to brew the coffee itself, thus combining a multistep beverage preparation process into a one step method. The specific items, making up the present invention, are grouped under the following headings in this application:

Flavorings for the flavor aging process

Packaging and packaging materials

The flavor aging process

Flavor development, synergism and protection

One step coffee beverage mixtures

The preferred "French press" type brewing method

Detailed description for each item follows below.

FLAVORINGS FOR THE FLAVOR AGING PROCESS

The flavorings of the present invention provide distinctive characteristics not found in any currently or previously known or used flavoring or flavor compound for coffee or coffee products. These distinctive characteristics are:

1. Utilization—instead of elimination—of air, to develop a full flavor and aroma profile.

2. Protection of the fully developed flavor and aroma profile for up to 6 months, without the removal of air from the packaging container.

3. Elimination of staling and oxidative rancidity development, once the packaging container is opened, used and stored repeatedly by the final user.

4. Synergism with the roasted coffee's own flavor and aroma. The combination of the flavorings, specific to the flavor aging process and the roasted coffee's own flavor and aroma through the three stage aging process rounds out as well as enhances the coffee beans' innate flavor and aroma, developed during roasting. It also masks the high bitter and acid tones and thus increases the smoothness—also referred to as "body"— of fresh brewed coffee and coffee beverage.

5. The flavorings reduce the rate at which fats and oils in:
   a.) any materials mixed with the coffee
   b.) in the coffee itself become rancid (or air oxidize).

The flavors and flavor compounds, useful in the present invention, comprise two major groups, collectively referred to as malt and cinnamon flavor bases. Neither of them, by itself, is capable of achieving the above described effects. Only in combination, along with the other constituents of the liquid flavorings specially developed for the flavor aging process, applied with the flavor aging process itself do they provide all of the benefits enumerated above. The following examples show only a few, currently popular flavoring formulations and are not meant to be either exhaustive or typical of the range of flavorings usable in this invention.

The malt flavor base, used in the present invention as part of the flavorings specifically developed for the flavor aging process, is plated onto the whole or ground roasted coffee. The amount of malt flavoring added depends upon specific malt flavoring employed. When the malt flavoring is ethylmaltol, as little as about 40 ppm may be used. Typically, the total of all malt flavoring is no more than about 830 ppm. In one embodiment, a commercial malt extract is used as the malt flavor base and the amount is adjusted to provide the coffee product of the present invention with the following concentration of compounds present in the malt extract.

| Compound | Range, PPM | Preferred range, PPM | Most preferred range, PPM |
| --- | --- | --- | --- |
| Pyrolidine | 100–300 | 200–250 | 225–250 |
| 3 hydroxy-2-methyl-4-pyrone (maltol) | 125–250 | 120–180 | 140–170 |
| 3 hydroxy-2-ethyl-4 pyrone (ethylmaltol) | 40–80 | 50–70 | 55–65 |
| Other native malt extract compounds | 100–200, based on extraction method | | |

The cinnamon flavor base, used in the present invention as pan of the flavorings specifically developed for the flavor aging process, is plated onto the whole or ground roasted coffee. In one embodiment, a commercial cassia oil, or oil of cinnamon is used as the cinnamon flavor base and the amount is adjusted to provide the coffee product of the present invention with the following concentration of cassia oil.

| Compound | Range, PPM | Preferred range, PPM | Most preferred range, PPM |
| --- | --- | --- | --- |
| Cassia oil with other native cinnamon oils | 100–500 | 200–400 | 280–360 |

It is also preferred that the ratio of malt flavoring to cinnamon flavoring is between 10:1 and 1:10.

EXAMPLE I.

The following ingredients were combined in the ratios set forth below, to prepare a vanilla flavoring for the flavor aging process, which includes compounds from both the malt and cinnamon flavor bases:

| Ingredient | As is, % | Amount added to coffee beans at 3.3% flavor use level, in PPM |
| --- | --- | --- |
| Carrier (Propylene glycol and other non aromatic alcohols) | 67.50 | |
| Vanilla flavoring | 30.30 | |
| Cinnamon flavoring (Cassia oil) | 1.00 | 331 |
| Malt extract (including pyrolidine) | 0.75 | 248 |
| 3 hydroxy-2-methyl-4-pyrone (maltol) | 0.45 | 148 |
| | 100.00 | |

EXAMPLE II.

The following ingredients were combined in the ratios set forth below, to prepare an Irish cream flavoring for the flavor aging process, which includes compounds from both the malt and cinnamon flavor bases:

| Ingredient | As is, % | Amount added to coffee beans at 3.3% flavor use level, in PPM |
| --- | --- | --- |
| Carrier (Propylene glycol and other non aromatic alcohols) | 61.84 | |
| Irish cream flavoring | 24.33 | |
| Natural cream extract | 11.93 | |
| Cinnamon flavoring (Cassia oil) | 1.00 | 331 |
| Malt extract (including pyrolidine) | 0.75 | 248 |
| 3 hydroxy-2-ethyl-4-pyrone (ethylmaltol) | 0.15 | 49 |
| | 100.00 | |

EXAMPLE III.

The following ingredients were combined in the ratios set forth below, to prepare an orange-chocolate flavoring for the flavor aging process, which includes compounds from both the malt and cinnamon flavor bases:

| Ingredient | As is, % | Amount added to coffee beans at 3.3% flavor use level, in PPM |
|---|---|---|
| Carrier (Propylene glycol and other non aromatic alcohols) | 60.72 | |
| Orange chocolate flavoring | 37.20 | |
| Cinnamon flavoring (Cassia oil) | 1.00 | 331 |
| Malt extract (including pyrolidine) | 0.75 | 248 |
| Other natural malt extracts | 0.33 | 109 |
| | 100.00 | |

PACKAGING AND PACKAGING MATERIALS

An intrinsic part of the present invention is the use of air in the packaging container during the second and third stages of the flavor aging process and also the use of biodegradable or environmentally benign packaging materials. The whole beans or ground coffee are packaged, after the second flavor aging period into either bag or pouch containers formed from a coated or laminated paper material, where the coating or lamination(s) is made of food grade wax, biopolymer or polymer film, such as cellulose derivatives, cellophane or low-density polyethylene, polypropylene, and all other film forming compounds approved for food packaging, storage and distribution. Traditional packaging materials and containers may also be used, such as metallized composite laminated polymer film bags and pouches, as well as tin and other metal, polymer or glass jars, seals and lids. Vacuum or nitrogen flushing is not required or applied to extend shelf-life, when sealing these containers, as the flavor aging process, in its third stage in the packaging container also requires the presence of air and provides for a shelf-life of up to six months, regardless of the presence of air.

A representative selection of biodegradable and environmentally benign packaging materials follows below. The measure of air permeability is given as permeability to oxygen at 77 degrees Fahrenheit and at 50% relative humidity, since the two major external factors which determine permeability are relative humidity and temperature. All packaging materials and their combination, used in the present invention, are good moisture barriers, while allowing smaller gas molecules, such as nitrogen, carbon dioxide and oxygen controlled passage.

| Material - Outer ply, inner coating/lamination(s) | Oxygen permeability, cc/day/sq. m/atm |
|---|---|
| 60# white paper, 25# glassine wax | 5,000–8,000 |
| 50# bleached kraft paper, .70 mil polypropylene | 2,000–4,000 |
| 40# recycled news tan paper, .50 mil cellophane | 1,500–2,500 |
| 60# bleached, 25# waxed kraft paper | 4,000–6,000 |
| 50# bleached kraft paper, .50 mil HD polyethylene | 2,000–4,000 |
| 40# white paper, 1 mil cellophane, .50 mil conventional polyethylene | 3,000–3,500 |
| 40# bleached kraft paper, 1 mil cellulose acetate, 0.50 mil conventional polyethylene | 1,000–2,000 |
| 3 mil cellulose acetate film, with PVDC coating | 800–1,200 |

Some of the common traditional packaging materials, usable in the present invention are also listed below. Permeability values are given for the same conditions used for the biodegradable and environmentally benign packaging materials. While these materials generally have very low permeability values, the air left in the container at sealing, along with the air entering the container once it is opened, is used to complete the third aging period.

| Material - Composite film, with laminations | Oxygen permeability, cc/day/sq. m/atm |
|---|---|
| Metallized polyester lamination - 0.5 mil metallized polyester, 2 mil coextruded HDPE/LDPE | 3–12 |
| Foil lamination - 30#/r pouch paper, 7#/r LDPE, 0.00035" aluminum foil, 22#/r EAA copolymer | 0 |
| Mylar | 50–100 |

EXAMPLE IV.

The following environmentally benign bags were used to package, third-stage age, store and distribute flavor aged whole coffee beans:

| Manufacturer | Capacity | Material |
|---|---|---|
| AB Specially Packaging | 12 oz | 40# white recycled newspaper, 1 mil cellophane, 0.50 mil polyethylene |

EXAMPLE V.

The following biodegradable pouches were used to package, third-stage age, store and distribute flavor aged ground coffee:

| Manufacturer | Capacity | Material |
|---|---|---|
| Flexel | 2 oz | 3 mil cellulose acetate, PVDC coated for added tear resistance and heat sealability |

EXAMPLE VI.

The following pouches, made of traditional metallized laminated film material were used to package, second-stage age, store and distribute a one-step coffee beverage mixture, made with flavor aged ground coffee and a non-dairy based cappuccino flavored dry mixture:

| Manufacturer | Capacity | Material |
|---|---|---|
| Dow Chemical | 6 oz | 0.5 mil polyester, 1 mil Saran HB, 2 mil LDPE |

THE FLAVOR AGING PROCESS

The flavor aging process is an indispensable part of developing the full flavor, aroma and body of the coffee and coffee products of this invention. It comprises a three stage aging method, which differs as to its specific steps, based on whether the roasted coffee beans are used in whole or are ground to a consistency of all-purpose, drip, espresso or other coffee grind.

Coffees used in the present invention can be of all commercially available roasted varieties or blends thereof, due to the quality enhancement properties of the flavor aging process and the flavors developed for it. The following list shows a few, generally available and used coffee varieties, blends and roast types and is neither exhaustive nor typical of the range of coffees usable in this invention.

| Coffee type | Roast type |
|---|---|
| Brazilian Bourbon Santos | Italian |
| Colombian Medellin Supremo | City |
| Hawaiian Kona No. 1 | Continental |
| Kenyan AA Arabica | French |
| Mexican Altura Coatepec 85%, Robusta 15% blend | Viennese |
| Mocha Java CC blend | Full flavor |

The first embodiment of the three stage process of the present invention uses whole, roasted beans. The beans are coated first with a flavoring developed specifically for the flavor aging process, such as given in Examples I, II and III. The flavor coated beans are then poured into and kept in an airtight container from 96 to 168 hours, preferably between 132 to 156 hours and most preferably between 140 to 148 hours, at ambient temperatures, preferably between 40°–85° F., and most preferably between 50°–70° F. This step comprises the first stage of the aging process. The flavoring is then dried completely onto the beans in flowing warm air in an appropriate mechanical drying apparatus, where the exposure to the flowing warm air constitutes the second stage of the aging process. The temperature of the air, used for drying is between 80°–160° F., preferably between 100°–140° F. and most preferably between 120°–130°F., in order to minimize the loss of heat volatile aroma compounds, while its relative humidity is between 20–60%, preferably between 20–40% and most preferably between 20–30%. The dry, flavored beans are then packaged into either bag or pouch containers such as given in Examples IV, V and VI, without the use of vacuum or nitrogen flush when sealing or closing the packaging container.

This is where the third stage of the aging process takes place, using the air either left in the container or permeating through it at a controlled rate, at ambient temperatures, preferably between 40°–85° F., and most preferably between 50°–70° F., and where the relative humidity is between 20–70%, preferably between 20–50% and most preferably between 20–40%. This in-storage aging period must be at least 96 hours, preferably is at least 120 hours and most preferably is at least 144 hours. The volume of the container head space, required to hold air for the third stage of the aging process is between 20 to 50 percent of the total container volume, preferably is between 25 to 45 percent of the total container volume and most preferably is between 30 to 40 percent of the total container volume.

EXAMPLE VII.

The following materials and processing steps were combined under the conditions set forth below, to prepare a packaged, flavored whole bean coffee product:

| | Material | Process step | Equipment | Equipment/Condition |
|---|---|---|---|---|
| Coffee: | 75 lb Colombian Supreme, City roast | Flavor coating | Equipment: | EFC PM 550 tumbler Residence time: 5 minutes |
| Flavor: | 2.4 lb of Example I | | | Speed: constant Agitation: 5 minutes |

| Material | Process step | | Equipment/Condition |
|---|---|---|---|
| | Aging - 1st stage | Equipment: | 35 Gl. HDPE drum with airtight lid |
| | | Ambient temperature: | 55–65 F. |
| | | Residence time: | 144 hours |
| | Aging - 2nd stage | Equipment: | Wyssmont pilot lab continuous plate dryer |
| | | Air temperature: | 135 +/– 10 F. |
| | | Residence time: | 20 minutes |
| | | Speed: | constant |
| | | Agitation: | 20 minutes |
| | Filling | Equipment: | Taylor TE 10 small packer |
| Packaging: 12 oz capacity bag, made of Example IV material | Package sealing | Equipment: | ARO F-100 heat sealer with out vacuum or nitrogen flush |
| | Aging - 3rd stage | Ambient temperature: | 45–65 F. |
| | | Residence time: | 1–2 weeks warehouse storage |
| | | | 3 days shipping |
| | | | 1–30 days storage at customer's facility |

The second embodiment of the three stage process of the present invention uses ground roasted beans. The beans are coated first with a flavoring developed specifically for the flavor aging process, such as given in Examples I, II and III. The flavor coated beans are then poured into and kept in an airtight container from 12 to 36 hours, preferably between 16 to 32 hours and most preferably between 20 to 28 hours, at ambient temperatures, preferably between 40°–85° F., and most preferably between 50°–70° F. This step comprises the 1st stage of the aging process. The beans are then ground to a consistency of all-purpose, drip, espresso or any other coffee grind in use. This ground, flavored coffee is then kept in an air-tight container from 36 to 60 hours, preferably between 40 to 56 hours and most preferably between 44 to 52 hours, at ambient temperatures, preferably between 40°–85° F., and most preferably between 50°–70°F. This step comprises the second stage of the aging process. The ground, flavored coffee is then packaged into either bag or pouch containers such as given in Examples IV, V and VI, without the use of vacuum or nitrogen flush when sealing or dosing the packaging container. This is where the third stage of the aging process takes place, using the air either left in the container or permeating through it at a controlled rate, at ambient temperatures, preferably between 40°–85°F., and most preferably between 50°–70° F., and where the relative humidity is between 20–70%, preferably between 20–50% and most preferably between 20–40%. This in-storage aging period must be at least 96 hours, preferably is at least 120 hours and most preferably is at least 144 hours. The volume of the container head space, required to hold air for the third stage of the aging process is between 20 to 50 percent of the total container volume, preferably is between 25 to 45 percent of the total container volume and most preferably is between to 40 percent of the total container volume.

EXAMPLE VIII.

The following materials and processing steps were combined under the conditions set forth below, to prepare a packaged, flavored ground coffee product:

| | Material | Process step | | Equipment/Condition |
|---|---|---|---|---|
| Coffee: | 75 lb Mocha Java Continental roast | Flavor coating | Equipment: | EFC PM 550 tumbler |
| | | | | Residence time: 5 minutes |
| Flavor: | 2.4 lb of Example III | | | Speed: constant |
| | | | | Agitation: 5 minutes |
| | | Aging - 1st stage | Equipment: | 35 Gl. HDPE drum with airtight lid |
| | | | Ambient temperature: | 55–65 F. |
| | | | Residence time: | 24 hours |
| | | Grinding | Equiment: | Ditting 903 commercial grinder |
| | | Aging - 2nd stage | Equipment: | 35 Gl. HDPE drum with airtight lid |
| | | | Ambient temperature: | 55–65 F. |
| | | | Residence time: | 48 hours |
| Packaging: | 12 oz capacity bag, made of Example IV material | Package filling and sealing | Equipment: | Lane V8 form/fill/seal unit, without vacuum or nitrogen flush |
| | | Aging - 3rd stage | Ambient temperature: | 45–65 F. |
| | | | Residence time: | 1–2 weeks warehouse storage |

-continued

| Material | Process step | Equipment/Condition |
| --- | --- | --- |
| | | 3 days shipping |
| | | 1–30 days storage at customer's facility |

The third embodiment of the three stage process of the present invention uses ground roasted beans with a beverage preparation aid. Beverage preparation aids, useful in the present invention include powdered milk and its derivatives such as non-fat dry milk, buttermilk and cream, as well as dairy and non-dairy coffee whiteners, alone or mixed with flavorings, such as cappuccino, mocha, or Irish cream flavorings, cocoa, ground chocolate, vanilla and the like. Additionally, the beverage preparation aid may include insoluble components, such as ground cinnamon, cardamom and the like.

The beans are coated first with a flavoring developed specifically for the flavor aging process, such as given in Examples I, II and III. The flavor coated beans are then poured into and kept in an airtight container from 12 to 36 hours, preferably between 16 to 32 hours and most preferably between 20 to 28 hours, at ambient temperatures, preferably between 40°–85° F., and most preferably between 50°–70° F. This step comprises the 1st stage of the aging process. The beans are then ground to a consistency of all-purpose, drip, espresso or any other coffee grind in use. This ground, flavored coffee is then kept in an air-tight container from 36 to 60 hours, preferably between 40 to 56 hours and most preferably between 44 to 52 hours, at ambient temperatures, preferably between 40°–85° F., and most preferably between 50°–70° F. This step comprises the second stage of the aging process. The ground, flavored coffee is then packaged, together with a dry, powdered beverage preparation aid, at a specific ratio, into either bag or pouch containers such as given in Examples IV, V and VI, without the use of vacuum or nitrogen flush when sealing or closing the packaging container. This is where the third stage of the aging process takes place, using the air either left in the container or permeating through it at a controlled rate, at ambient temperatures, preferably between 40°–85° F., and most preferably between 50°–70° F., and where the relative humidity is between 20–70%, preferably between 20–50% and most preferably between 20–40%. In addition to completing the development of the ground coffee's full flavor, aroma and body, a very smooth, yet potent flavor combination, due to the infusion of flavor and aromatic compounds from the coffee beverage powder mixture into the ground coffee particles is also achieved during the third stage of the flavor aging process. This in-storage aging period must be at least 96 hours, preferably is at least 120 hours and most preferably is at least 144 hours. The volume of the container head space, required to hold air for the third stage of the aging process is between 20 to 50 percent of the total container volume, preferably is between 25 to 45 percent of the total container volume and most preferably is between 30 to 40 percent of the total container volume.

EXAMPLE IX.

The following materials and processing steps were combined under the conditions set forth below, to prepare a packaged, flavored ground coffee product:

| | Material | Process step | Equipment/Condition | |
| --- | --- | --- | --- | --- |
| Coffee: | 75 lb Bourbon Santos Viennese roast | Flavor coating | Equipment: | EFC PM 550 tumbler Residence time: 5 minutes |
| Flavor: | 2.4 lb of Example III | | | Speed: constant Agitation: 5 minutes |
| | | Aging - 1st stage | Equipment: | 35 Gl. HDPE drum with airtight lid |
| | | | Ambient temperature: | 55–65 F. |
| | | | Residence time: | 24 hours |
| | | Grinding | Equiment: | Ditting 903 commercial grinder |
| | | Aging - 2nd stage | Equipment: | 35 Gl. HDPE drum with airtight lid |
| | | | Ambient temperature: | 55–65 F. |
| | | | Residence time: | 48 hours |
| Dry mix: | 145.6 lb Irish flavored coffee beverage preparation aid | Filling | Equipment: | Taylor TE 10 small packer |
| Packaging: | 6 oz capacity bag, made of Example IV material | Package sealing | Equipment: | ARO 100 heat sealer, without vacuum or nitrogen flush |
| | | Aging - 3rd stage | Ambient temperature: | 45–65 F. |
| | | | Residence time: | 1–2 weeks warehouse storage 3 days shipping 1–30 days storage at customer's facility |

FLAVOR DEVELOPMENT, SYNERGISM AND PROTECTION

It is during the three step flavor aging process that the flavor and aroma characteristics of the products of the present invention are fully developed. Upon coating the roasted beans with any of the flavorings developed for the present invention, the resulting flavored coffee becomes completely unsuitable for consumption, as its basic coffee flavor and aroma are fully masked by overbearingly strong, even harsh flavor notes from the added flavorings. The following two examples show how the aging process develops the very high quality of the present invention's fully balanced flavor and aroma profiles.

EXAMPLE X.

The following sensory panel test was conducted under the conditions set forth below to determine the flavor and aroma profile of a roasted, flavored and packaged whole bean coffee product during the three step flavor aging process:

| Product and Process | Days aged | | Flavor profile | Aroma profile |
|---|---|---|---|---|
| Example VII | 0 | Coffee Added | - very low<br>- vanilla: too sharp<br>- cinnamon: too sharp<br>- malt: not discernible | Too strong, sharp vanilla and cinnamon |
| | | Balance: | none | |
| | 6 | Coffee Added | - low<br>- vanilla: too sharp<br>- cinnamon: too sharp<br>malt: discernible | Too strong, sharp vanilla and cinnamon with some coffee and malt notes |
| | | Balance: | none | |
| | 7 | Coffee Added | - medium<br>- vanilla: very strong<br>- cinnamon: strong<br>- malt: very discernible | Strong vanilla and cinnamon with heavy coffee and malt notes |
| | | Balance: | coffee and malt | |
| | 14 | Coffee Added | - strong<br>- vanilla: medium<br>- cinnamon: low<br>- malt: medium | Strong coffee with vanilla, along with cinnamon and malt notes |
| | | Balance: | full | |

EXAMPLE XI.

The following sensory panel test was conducted under the conditions set forth below to determine the flavor and aroma profile of a roasted, flavored and packaged ground bean coffee product during the three step flavor aging process:

| Product and Process | Days aged | | Flavor profile | Aroma profile |
|---|---|---|---|---|
| Example VII | 0 | Coffee Added | - very low<br>- orange: too sharp<br>-chocolate: very strong<br>- cinnamon: too sharp<br>- malt: not discernible | Too strong, sharp orange and cinnamon |
| | | Balance: | none | |
| | 1 | Coffee Added | - low<br>- orange: too sharp<br>- chocolate: strong<br>- cinnamon: too sharp<br>- malt: discernible | Too strong, sharp orange and cinnamon with chocolate and some coffee and malt notes |
| | | Balance: | none | |

-continued

| Product and Process | Days aged | | Flavor profile | Aroma profile |
|---|---|---|---|---|
| | 3 | Coffee Added | - medium<br>- orange: very strong<br>- chocolate: strong<br>- cinnamon: strong<br>- malt: very discernible | Strong orange and cinnamon with strong chocolate, coffee and malt notes |
| | | Balance: | coffee, chocolate and malt | |
| | 10 | Coffee Added | - strong<br>- orange: medium<br>- chocolate: medium<br>- cinnamon: low<br>- malt: medium | Strong coffee with orange, chocolate, cinnamon and malt notes |
| | | Balance: | full | |

The present invention also yields an unexpected synergism between the roasted coffee's own flavor and aroma and the combination of the flavorings, specific to the flavor aging process. Using these flavorings with the three stage aging process has been found to enhance the roasted coffee beans' innate flavor and aroma strength, developed during roasting as compared to control, unflavored roasted coffee beans. It also masks the high bitter and acid tones and thus increases the smoothness—also referred to as "body"—of fresh brewed coffee and coffee beverage. The following example shows this synergistic effect.

EXAMPLE XII.

The following sensory panel test was conducted under the conditions set forth below to determine the flavor and aroma profile of a roasted, flavored and packaged whole bean coffee product vs. a control, unflavored batch, roasted and packaged the same way:

In addition, the present invention provides another unexpected effect, the protection of the fully developed flavor and aroma profile for up to 6 months, without the removal of air from the packaging container and the elimination of staling and oxidative rancidity development, once the packaging container is opened, used and stored repeatedly by the final user. For example, it is anticipated that any coffee not treated by the flavorings and process of the present invention would become stale if exposed to air in the way the present invention does.

EXAMPLE XIII.

The following benchtop taste test was conducted under the conditions set forth below to determine the staleness and rancidity level of a roasted, flavored and packaged whole bean coffee product vs. a control, unflavored batch, roasted and packaged the same way:

| Product and Process | | Days aged | Flavor profile | Aroma profile |
|---|---|---|---|---|
| Control | - same as Example VII but not flavored and aged | 14 day storage | Mellow fruit and walnut<br><br>Strength*: 6.5 | Smooth and nutty<br><br>Strength*: 7.0 |
| Example VII | | 14 days | Coffee: Mellow fruit and walnut<br>Strength*: 8.0<br>Added - vanilla, cinnamon and malt<br>Strength*: 8.0 | Smooth and nutty<br><br>Strength*: 8.0<br>Added vanilla and cinnamon<br><br>Strength*: 8.0 |

*Average of five taste tests on a hedonic scale of 1 to 10, at 95% confidence level.

Accordingly, there is an average 18.5% increase in apparent coffee flavor strength and a 12% increase in apparent coffee aroma strength, due to this unexpected synergism between the roasted coffee's own flavor and aroma and the combination of the flavorings, specific to the flavor aging process.

| Product and Process | | Days stored | Staleness** | Rancidity** |
|---|---|---|---|---|
| Control | - same as Example VII but not flavored and aged | 90 before use<br>5 in use | Noticeable<br>Pronounced by 3rd day of use | Not noticeable<br>Noticeable by 5th day of use |

| Product and Process | Days stored | Staleness** | Rancidity** |
| --- | --- | --- | --- |
| Example VIII | 90 before use | Not noticeable | Not noticeable |
| | 5 in use | Slightly noticeable by 5th day | Not noticeable |

**Result of two taste tests

ONE STEP COFFEE BEVERAGE MIXTURES

Combining the second stage flavor aged ground coffee and a dry beverage preparation aid, in a packaging container sealed without the use of vacuum or nitrogen flush, in environmentally benign or biodegradable materials, such as wax, biopolymer or polymer coated air permeable paper bags and pouches, as well as in traditional packaging materials, such as metallized composite laminated polymer film bags and pouches, results in a uniquely smooth, yet potent flavor combination, due to the infusion of flavor and aromatic compounds from the coffee beverage powder mixture into the ground coffee particles, during the third stage of the flavor aging process, which takes place in the packaging container, as given in Example IX.

Additionally, the compounded flavor aged ground coffee and these dry, powdered coffee beverage preparation aids, when packed and aged together in an environmentally benign, biodegradable or traditional packaging container, again without the use of vacuum or nitrogen flush, provide a new product. This product, when used in a "French press" type coffee maker, produces a fresh brewed coffee beverage, as the coffee whitener portion of these mixes, with other flavoring ingredients, if present, along with the milk and cream derived ingredients, are dissolved at the same time in the same apparatus used to brew the coffee itself, thus combining a multistep beverage preparation process into a one step method.

Coffee beverage preparation dry mixtures, used in the present invention were made with commercially available coffee whitener, non-fat dry milk, sweetener, cocoa, ground chocolate, vanilla flavor and ground cinnamon. For example, the cappuccino beverage preparation aid is a blend of coffee whitener, non-fat dry milk, sweetener, cocoa, vanilla flavor and ground cinnamon. The following list shows only a few instances of such products, as used together with the flavored coffee product of the present invention. This list is neither exhaustive nor typical of the range of coffee beverage preparation aids usable in this invention.

| Coffee beverage type | Ratio of beverage preparation aid to ground coffee |
| --- | --- |
| Cappuccino | 60:40 |
| Irish cream | 66:34 |
| Mocha | 75:25 |
| Orange Chocolate | 78:22 |

THE PREFERRED "FRENCH PRESS" TYPE BREWING METHOD

It has been found, that the product of the present invention is best utilized with the filterless, direct extraction method of French press type coffee brewers, to prepare the highest quality coffee and coffee beverages for immediate consumption. The preparation process involves only one step, the extraction of the soluble coffee compounds from the ground coffee and, optionally, the full dissolution and dispersion of the dry, powdered coffee beverage aid.. This is achieved by filling in the appropriate amount of ground coffee, i.e. 1/4 oz (7 grams) and 3 ¾ to 7 ¾ oz water close to or at boiling point, to yield one cup of fresh brewed coffee or coffee beverage. Moving the plunger up and down inside the brewing container a few times then completely mixes and extracts the soluble coffee compounds and, optionally, dissolves and disperses the compounds from the dry powder coffee beverage preparation aid, mixed together with the ground coffee product of the present invention.

Therefore, the product of the present invention, when it combines said flavor-aged ground coffee product with a dry powder coffee beverage preparation aid in the packaging container, makes possible the preparation of a complete, fresh brewed coffee beverage, such as cappuccino, mocha, Irish cream, etc., in one step, using the filterless, direct extraction method offered by the French press type coffee brewing units. Accordingly, the preferred method to prepare coffee and coffee beverages with the products of the present invention is the use of single serving or multiple serving size French press type brewing units, where said beverages are prepared and served fresh in said brewing units.

What we claim is:

1. A three stage flavoring process comprising:
   a.) combining roasted coffee and a liquid flavoring:
   said liquid flavoring comprising between about 40 ppm to about 830 ppm malt flavor, and a cinnamon flavor comprising between about 100 to about 500 ppm of cinnamon oil;
   b.) transferring said coffee and flavoring combination to an airtight container for storage of about 96–168 hours;
   c.) drying said flavoring on said coffee;
   d.) aging said flavored, roasted coffee by exposing said flavored, roasted coffee to air for at least 144 hours, but for a period of time less than six months, in a manner effective to permit the air to diffuse throughout said flavored, roasted coffee; and
   e.) packaging said flavored, roasted coffee in a manner that permits air contact.

2. The process of claim 1 in which said packaging is using an air permeable packaging material.

3. The process of claim 1 in which said packaging is done using an air impermeable packaging material and said packaging is effected to include between about 30 and 40 percent of air.

4. The process of claim 1, in which said packaging materials are selected from the group consisting of coated paper material, laminated paper material, polypropylene, metallized composite laminated polymer film, tin, metal, polymer and glass jars.

5. The three stage flavoring process, according to claim 1, in which said coffee is whole roasted coffee beans.

6. The three stage flavoring process, according to claim 1, in which said coffee is ground roasted coffee beans.

7. The three stage flavoring process, according to claim 6, Which further comprises compounding said roasted coffee with a dry, powdered beverage preparation aid.

8. The process of claim 1 in which said malt flavor consists of, based on the weight of the coffee:

1.) 100 to 300 ppm pyrolidine;
2.) 125 to 250 ppm 3-hydroxy-2-methyl-4-pyrone;
3.) 40 to 80 ppm 3-hydroxy-2-ethyl-4-pyrone; and
4.) 100 to 200 ppm other malt extract compounds.

9. A method of reducing staling and oxidative rancidity development in packaged coffee once the package is repeatedly opened and stored by the final user, comprising:

a.) adding an amount of malt flavoring and an amount of cinnamon flavoring effective to reduce staling and rancidity to said coffee, said malt flavoring and said cinnamon flavoring are added as pan of a liquid composition;

b.) drying said liquid composition on said coffee;

c.) exposing said coffee and flavoring admixture to air for at least 144 hours, but for a period of time less than six months.

10. A method of reducing staling and oxidative rancidity development in packaged coffee once the package is repeatedly opened and stored by the final user, comprising:

a.) adding an amount of malt flavoring, and an amount of cinnamon flavoring effective to reduce staling and rancidity, and a dry, powdered beverage preparation aid to said coffee, said malt flavoring and said cinnamon flavoring are added as part of a liquid composition;

b.) drying said liquid composition on said coffee;

c.) exposing said coffee and flavoring admixture to air for at least 144 hours, but for a period of time less than six months.

* * * * *